Nov. 14, 1961 W. G. HARVEY 3,008,188
FEED CONTROLLER FOR INJECTION MOLDING MACHINES
Filed May 5, 1959
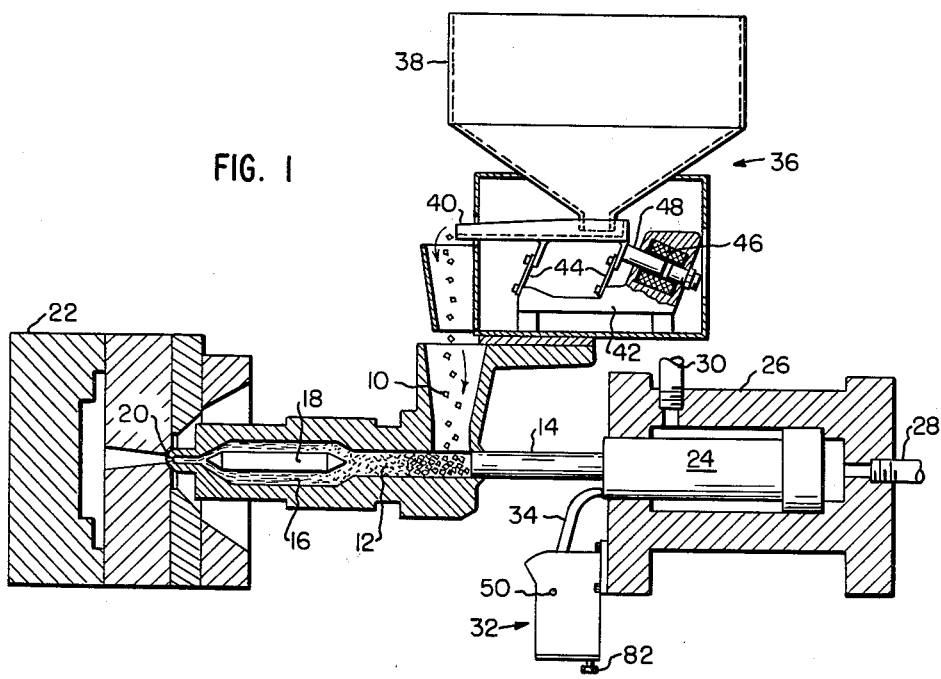
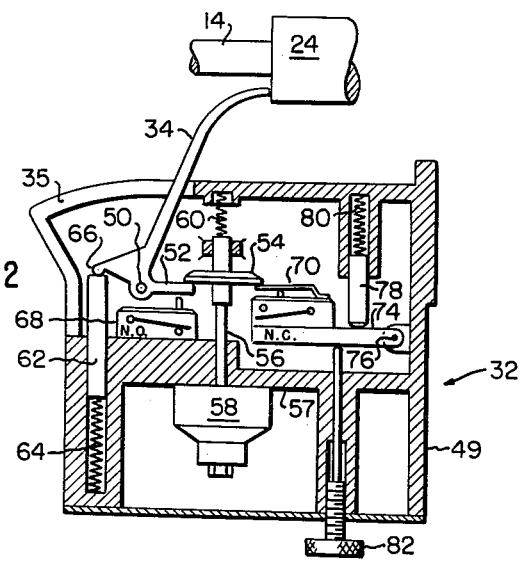
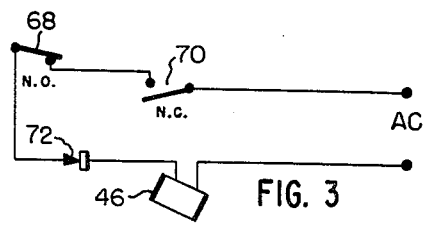
INVENTOR.
WILFRED G. HARVEY
BY
KENWAY, JENNEY, WITTER & HILDRETH
ATTORNEYS United States Patent Office 3,008,188
Patented Nov. 14, 1961

3,008,188
FEED CONTROLLER FOR INJECTION
MOLDING MACHINES
Wilfred G. Harvey, 249 Abbott Ave., Leominster, Mass.
Filed May 5, 1959, Ser. No. 811,101
7 Claims. (Cl. 18—30)

This invention relates in general to control instruments and in particular comprises a new and improved compensating feed controller for injection molding machines.

Injection molding is a process that converts small discrete pellets of thermoplastic resins into shaped integral articles of different sizes and configurations. Basically, the process consists of five steps, (1) feeding the plastic pellets into an injection molding machine; (2) melting the feed; (3) injecting the melt into a mold; (4) chilling the mold, and (5) ejecting the finished piece from the mold. In accordance with the present general practice granules of plastic are dropped into cylinders of an injection molding machine and pushed into a heating chamber by a ram. The granules melt as they pass through the heating chamber and the pressure of the ram is transmitted through the unmelted and partially melted granules to force the melt out through a nozzle into a mold. When the mold is filled the ram retracts and subsequently the mold opens to discharge the product.

Perhaps one of the most perplexing problems that has presented itself to injection molding lies in the feeding of the plastic granules into the cylinder. The ram retracts to the same position before each feed stroke and, presumably, the same volume of plastic is refilled on each cycle, giving rise to the term "volumetric feeding." In practice, however, the method has resulted in variation in shot weight and piece dimensions, and in flash or large area pieces. Flash occurs when the mold opens slightly and some melt flashes into the parting crack, leaving an unwanted fringe around the piece. These variations can be traced to variation in pressure at the nozzle, which in turn are due mostly to variations in the weight of the material fed. Because the orientation of loosely falling granular cubes is not the same from shot to shot and because the size and shape of the granules may not be constant the weight fed by the volumetric method can vary over a wide range, particularly in the smaller machines. An extra-heavy shot results, on the next shot, in there being a thicker-than-usual bed of solid particles through which the ram pressure must be transmitted to the melt. Since the ram pressure is set at a fixed value, the pressure at the nozzle drops, causing the mold cavities to be only partly filled and reduced weight or dimensions in the molded article. Over adjustment of this type of feed control will cause the feed to back up and choke off the machine.

An alternative feeding system that is presently available is known as a "weight-feeder." As its name indicates, this type of feeder weighs the shot before dropping it into the injection cylinder. Weight-feeders usually require limit switches to prevent over feeding and the machine is then operated in either a starved condition or a backed off condition, with no compensation in between.

The object of the present invention is to improve the regularity of feeding injection molding machines, and is in the nature of an improvement over feed control systems presently available in that the exact amount of feed material is deposited in the injection cylinder. Instead of relying mainly upon volume or weight as a measure of the feed material, the essential feature of the present invention is in a control system that senses the length of the ram stroke and applies it to adjust the feed for the next shot accordingly. In case large granules or some variation in size occurs, the system automatically feeds more or less material, therefore providing the exact amount of material ahead of the injection ram and steplessly compensates to any varying conditions of the raw material.

A more general object of this invention is to improve the quality of articles produced by injection molding. Another object is to provide an automatically self-compensating feed controller for injection molding machines. Still another object is to increase the efficiency of injection molding machines.

The specific advantages of the invention will be readily understood from the description which follows, taken in connection with the accompanying drawings in which:

FIG. 1 is a sectional view in side elevation of an injection molding machine to which a feed controller has been added, FIG. 2 is a sectional view in side elevation of a feed controller made in accordance with this invention, and FIG. 3 is a simplified diagram of a circuit that may be used in this invention.

Referring now to the drawings, FIG. 1 illustrates a typical injection molding machine in which plastic pellets 10 are dropped from a feeding device into an injection cylinder 12. For injection molding these pellets are typically thermoplastic resins normally in the form of cubes, spheres, or stubby cylinders. A ram 14 arranged for reciprocation in the cylinder 12 is shown herein its retracted position to receive a charge of pellets 10. On an injection stroke the ram 14 comes forward rapidly, forcing the pellets 10 into a heating chamber 16 and compacting them around a stationary torpedo 18 mounted in the heating chamber 16. As the force of the ram pushes the charge of pellets through the heating chamber, the charge progressively turns into a melt and passes out through a nozzle 20 into a mold 22.

In the machine shown in FIG. 1 the ram 14 is actuated by a hydraulically operated piston 24, mounted for reciprocation in a hydraulic cylinder 26. Suitable hydraulic connections 28 and 30 are fitted to the cylinder and lead to auxiliary pumps and valves.

Mounted to the frame of the cylinder 26 is a novel feed controller 32 which constitutes the preferred embodiment of this invention. A lever 34 pivoted to the controller and projecting from it, extends into the path of the piston 24 in such a fashion that the lever will be rocked as the piston reciprocates. The purpose of this controller is to regulate the amount of plastic material deposited in the cylinder 12 before each feed stroke of the ram 14. The controller electrically connects with a vibratory feeding device, generally indicated by the reference character 36.

The vibratory feed 36 is mounted over the injection portion of the machine and includes a hopper 38 in which the pellets are stored. Directly beneath the hopper is a tray 40 mounted to a fixed base 42 by way of spring supports 44. Angularly disposed adjacent to the tray is a coil 46 having an armature 48 engaging with one end of the tray 90. In practice, when the controller 32 completes a circuit to the coil 46, the armature 48 reciprocates rapidly in and out of the coil 46, vibrating the tray 40 and causing pellets 10 to shake off the end of the tray into the cylinder 12.

Referring now to FIG. 2 there is illustrated in detail a cross-section of the controller 32 shown in simple outline in FIG. 1. The parts of the controller are generally contained in a housing 49 generally box-like in appearance. The lever 34 is mounted on a pivot pin 50 which in turn is fastened to the housing 49. The lever passes out through an elongated opening 35 in the housing and engages the face of the piston 24. This lever is formed with a short arm 52 which is held biased against a normally open microswitch 68 by means of a rod 62 and spring 64 engaging with an oppositely extending arm 66 and urging both the lever and short arm in a clockwise direction.

Mounted in close proximity to the lever and microswitch is a vertically disposed stem 56 arranged to reciprocate in the housing. The lower portion of the stem 56 passes through a wall 57 and fastens to the apex of a collapsible, pneumatic timing head 58 secured to the opposite side of the wall 57. The stem is restrained in a downward position by means of a coil spring 60 compressed between the housing and the upper end of the stem. Formed along the stem is a collar 54 having one portion resting on the short arm 52 and another portion resting on a normally closed microswitch 70. The microswitch 70 is mounted on a rocker 74 which in turn is pivoted about a pin 76. Bearing against the upper side of the rocker is a rod 78 held in pressure contact by a spring 80. Supporting the rocker from the bottom is an adjusting screw 82. Obviously from this arrangement the position of the rocker and the microswitch 70 can be altered by rotating the adjusting screw 82. The object of mounting the microswitch 70 in this fashion will become apparent during the course of the following description of the operation of the controller.

In the drawings the ram and piston are shown in their retracted positions with the lever held hard over to the right by reason of the rod 62 and spring 69 pushing against the arm 66. When the ram makes a feed stroke the lever 34 being in contact with the piston will rock about the pin 50 in a counter-clockwise direction. The extent that the lever is rocked will depend on the length of the stroke made by the ram and piston. Since the hydraulic pressure that operates the piston remains constant during the feed stroke the length of the stroke may vary depending on the quantity and density of charge of plastic pellets in the cylinder. Should the charge be large or densely packed the ram will not be able to extend to its normal position. On the other hand if the charge is small or loosely arranged the ram will make a longer stroke than it would with a normal charge. In any event the extent of lever movement will depend on the length of the stroke made by the ram.

Assuming, now, that a charge of plastic material has been deposited in the cylinder 12 the ram 14 then makes a feed stroke and rocks the lever 34. When the lever is rocked, the short arm 52 pushes up under the collar 54 thereby forcing up the stem 56 and collapsing the timing head 58. As soon as the arm 52 moves out of contact with the microswitch 68, it contacts open, at the same time the collar 54 moves out of contact with the microswitch 70 and its contacts close.

On the return stroke of the ram the lever follows the piston back to its normal position because of the spring 64 pushing against the rod 62 and the arm 66. As soon as the arm 52 comes down on the microswitch 68 its contacts close, completing a circuit through a rectifier 72 to the coils 46 thereby energizing the vibratory feeder. After a feed stroke the stem 56 and its collar 54 do not immediately follow the return of the lever and piston since the collapsible timing head 58 will recover its original shape rather slowly. It will be obvious then that after a feed stroke of the ram the circuit to the vibratory feeder will be closed for a certain period. The period will last until the timing head resumes its normal shape. The spring 60, by pushing on the stem 56 will assist the timing head in its recovery. As soon as the timing head fully recovers and the stem returns to its initial position, the collar will come down on the normally closed microswitch 70 and open its contacts, thereby stopping the vibratory feeder.

From what has been said it will be clear that the length of time that the vibratory feeder operates will be determined by the length of the previous feed stroke made by the ram. If a long stroke is made because of a small charge of pellets, the lever will pivot accordingly and lift up the collar 54 higher than usual. This of course will more fully collapse the timing head and extend the time it will take to return to its normal shape. When the ram returns from its feed stroke the circuit is closed and pellets are discharged into the feed cylinder. Pellets will continue to be fed into the cylinder until the timing head fully recovers its shape. Since, on a long stroke, the head will collapse more than usual, it will obviously take longer to recover and the longer it takes to recover, the more plastic is fed into the feed cylinder for the next stroke of the ram.

Conversely, if the feed cylinder had an excessive charge and the ram made a short stroke, the timing head would collapse only slightly. Consequently, the period of operation of the vibratory feeder would be short and the amount of plastic material fed into the cylinder for the next ram stroke would be small.

In this way the controller automatically compensates for variations in the amount, size or density of materials in each charge. Under normal operating conditions, using homogeneous materials of generally constant size, the controller will stabilize itself after the first few cycles, and make normal ram strokes with approximately the same charge on each stroke. Should the material be made up of various size pellets the controller automatically feeds more or less material, therefore providing the exact amount of material ahead of the injection ram and steplessly compensates to any varying conditions of the raw material.

Since the different molds may be fashioned with different size cavities, the quantity of plastic material required to fill the cavity of one mold will vary from that required to fill a different size mold. To pre-set the controller to accommodate the requirements of a particular mold manual adjustment is provided. This adjustment is made by rotating an adjusting screw 82 to raise or lower the normally closed microswitch 70. If the microswitch 70 is raised the length of feeding time will be shortened, whereas if it is lowered the time will be longer since the collar 54 will have a greater distance to travel before it strikes the microswitch.

This controller is extremely efficient and flexible since it guarantees that there will always be a proper charge of material despite the character or quality of the feed. The controller is ideally suited for installation on any injection machine in which the stroke of the injection ram varies in length according to the amount of material in each charge. The controller may be easily and quickly installed on any molder now available without extensive alteration. Obviously, the vibratory feeder is shown only by way of example and it will be understood that a variety of other type dispensers may be used to equal advantage.

Many other modifications may be made without departing from the spirit of my invention.

Having thus disclosed my invention what I claim and desire to obtain by Letters Patent of the United States is:

1. An automatic feed controller for an injection molding machine having an injection ram mounted for reciprocation in said machine, comprising electrically operated dispensing means, a spring biased lever pivotally mounted in said controller and extending into the path of said ram, a normally open microswitch mounted adjacent said lever, a collapsible pneumatic timing head fixedly mounted in said controller, a spring-loaded stem associated with said timing head and mounted to reciprocate within said controller, a collar formed long said stem and arranged to cooperate with said lever, a normally closed microswitch adjustably mounted adjacent said collar, a feed stroke of said ram effective to pivot said lever and lift said collar thereby compressing said timing head to an extent proportional to the length of said feed stroke, a return stroke of said ram effective to again pivot said lever to close said normally open microswitch and complete a circuit to said feeding device, said timing head delaying the opening of said normally closed microswitch until a proper charge of feed is deposited in said molding machine by said dispensing means.

2. An automatic feed controller for an injection molding machine having an injection ram mounted for reciprocation in said machine, comprising electrically operated dispensing means for depositing a charge of plastic material into said molding machine, a series circuit including means for actuating said dispensing means, a variable timing device, actuating means responsive to an injection stroke of said ram for actuating said timing device, the period of operation of said timing device being controlled by the length of the stroke of said ram, said actuating means being operative on the return stroke of said ram to close said circuit to said dispensing means, said timing device being operative at the end of its cycle to open said circuit and thereby deactivate the dispensing means.

3. An automatic feed controller for an injection molding machine having an injection ram mounted for reciprocation in said machine, comprising electrically operated dispensing means for depositing a charge of plastic material into said molding machine, a series circuit including means for actuating said dispensing means, first and second switches included in said circuit, a variable pneumatic timing device operatively associated with said second switch, actuating means responsive to an injection stroke of said ram for simultaneously closing said second switch and actuating said timing device, the period of operation of said timing device being controlled by the length of the stroke of said ram, said actuating means being operated on the return stroke of said ram to close said first switch and thereby complete the circuit to said dispensing means, said timing device being operative at the end of its cycle to open said second switch and thereby deactivate the dispensing means.

4. An automatic feed controller for an injection molding machine having an injection ram mounted for reciprocation in said machine, comprising electrically operated dispensing means for depositing a charge of plastic material into said molding machine, a series circuit including means for actuating said dispensing means, first and second switches in said circuit, a resilient timing head operatively associated with said circuit, actuating means responsive to an injection stroke of said ram for simultaneously closing said second switch and compressing said timing head, the period of operation of said timing head being controlled by the length of the stroke of said ram and the resulting amount of compression of the head, said actuating means being operative on the return stroke of said ram to close said first switch and thereby complete the circuit to said dispensing means, said timing head being operative at the end of its decompression to open said second switch and thereby de-energize the dispensing means.

5. An automatic feed controller for an injection molding machine having an injection ram mounted for reciprocation in said machine, comprising electrically-operated dispensing means for delivering a charge of plastic material into said molding machine, a control circuit for operating said dispensing means, first and second switches included in said circuit, a collapsible pneumatic timing head operatively associated with said switches, actuating means responsive to an injection stroke of said ram for simultaneously closing said second switch and collapsing said timing head, said timing head being temporarily collapsed to an extent proportional to the length of a stroke of said ram, said actuating means being responsive on the return stroke of said ram to close said first switch and thereby close said circuit to energize said dispensing means, said timing head being operative upon recovery to open said second switch and thereby open the circuit to de-energize said dispensing means.

6. An automatic feed controller according to claim 5, wherein at least one of said switches is adjustably mounted relative to said actuating means whereby the period of operation of said dispensing means may be selectively altered.

7. An automatic feed controller for an injection molding machine having an injection ram mounted for reciprocation therein and dispensing means for delivering a charge of material into said machine, comprising a control circuit for energizing said dispensing means, ram-following means reciprocably movable in response to reciprocation of said ram, and a resiliently deformable timing head arranged to be deformed by said ram - following means in at least a first portion of the movement thereof to an extent proportional to the length of the ram stroke, said ram-following means being operative to close said circuit in said first portion of its movement, said timing head on reforming being operable to open said circuit.

References Cited in the file of this patent

UNITED STATES PATENTS

| | | |
|---|---|---|
| 2,033,735 | Pack | Mar. 10, 1936 |
| 2,627,087 | Hendry | Feb. 3, 1953 |
| 2,736,922 | Schieser et al. | Mar. 6, 1956 |
| 2,760,232 | Rougemont et al. | Aug. 28, 1956 |